D. MILLINGTON & C. MUNTHE.
APPARATUS FOR SLITTING SCREWS.
APPLICATION FILED JULY 7, 1910.
988,802.
Patented Apr. 4, 1911.
6 SHEETS—SHEET 3.
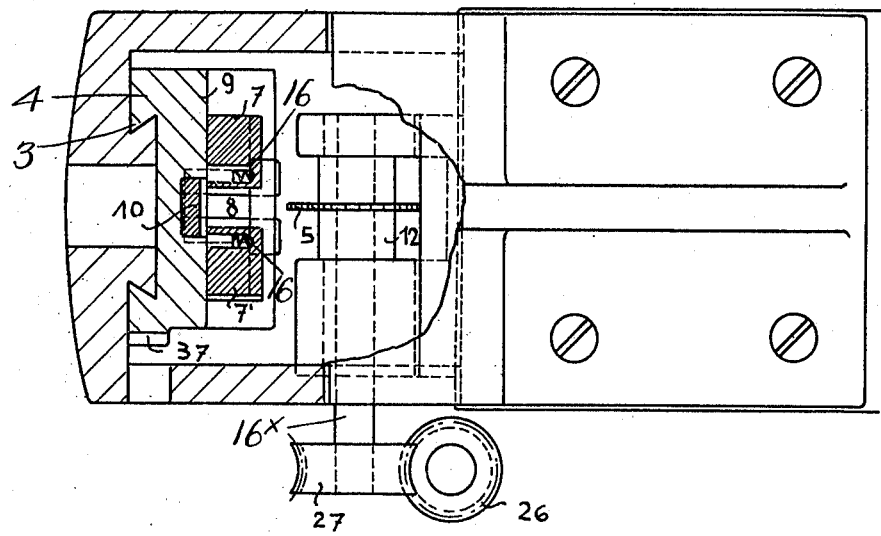
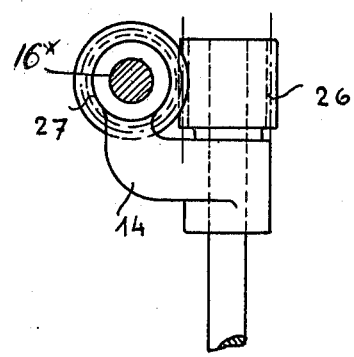
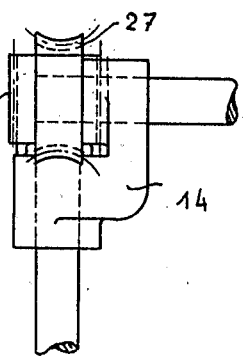
Attest.
Bent M. Stahl.
Ewd C. Tobson.
Inventors.
Christoffer Munthe.
David Millington.
by Spear, Middleton, Donaldson & Spear
Attys.

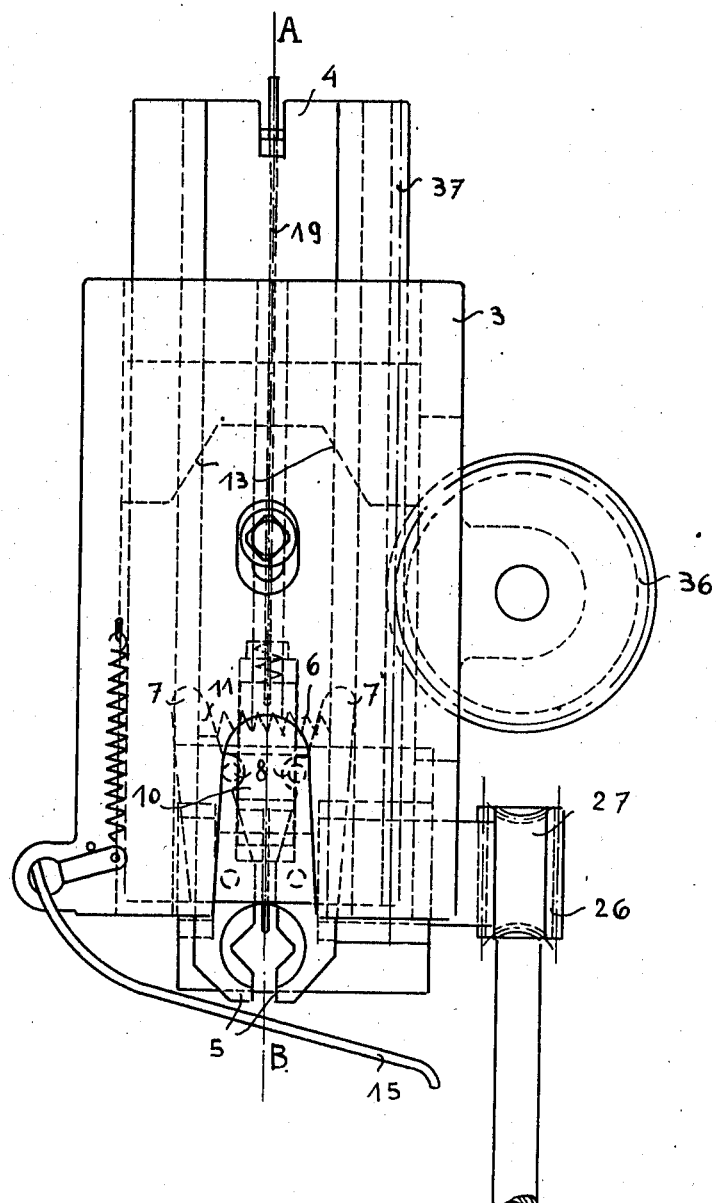

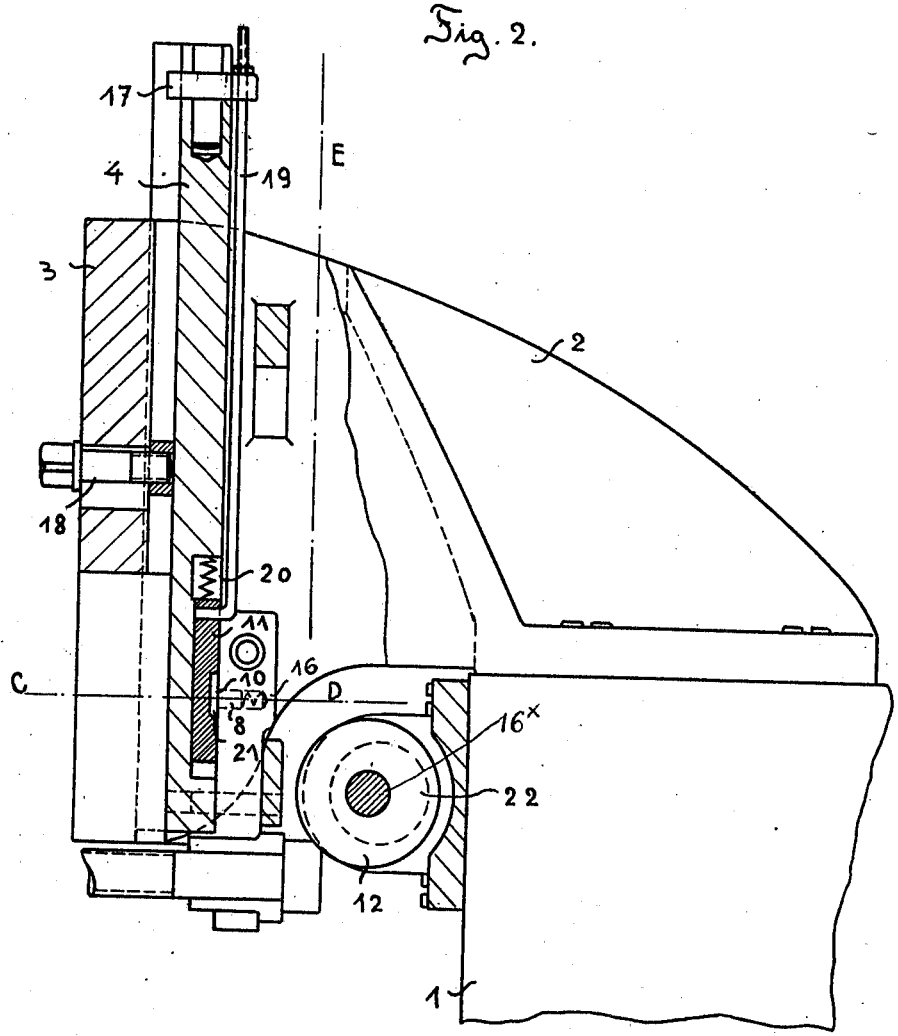

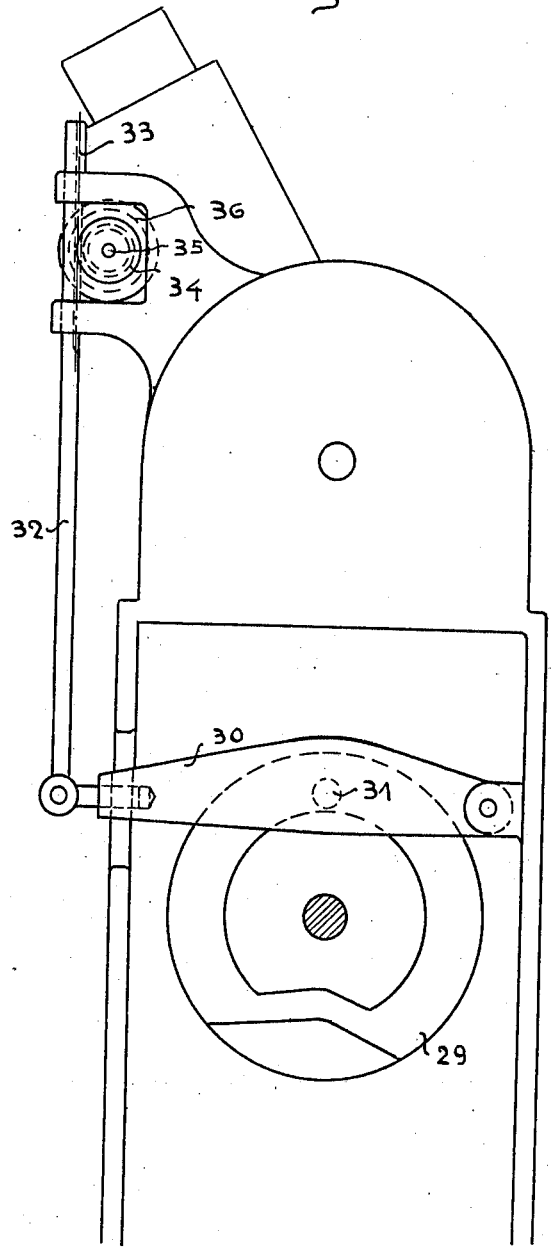

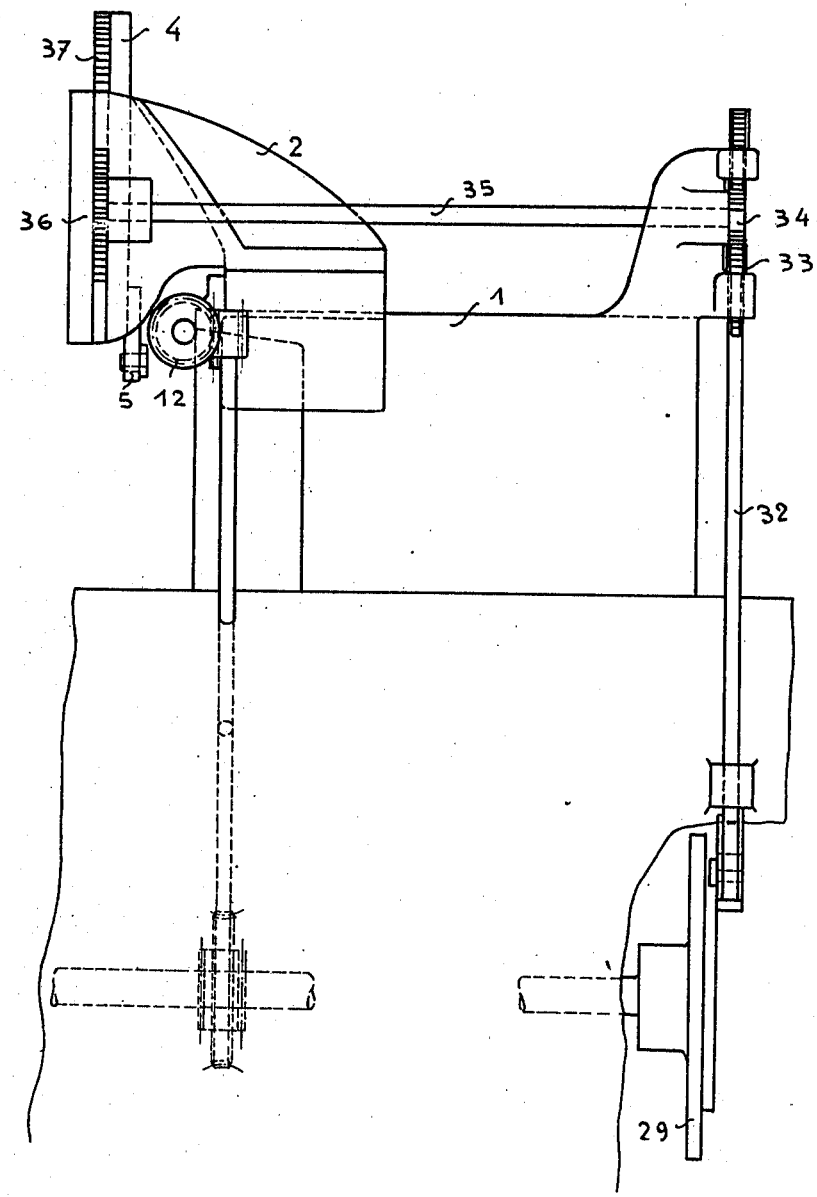

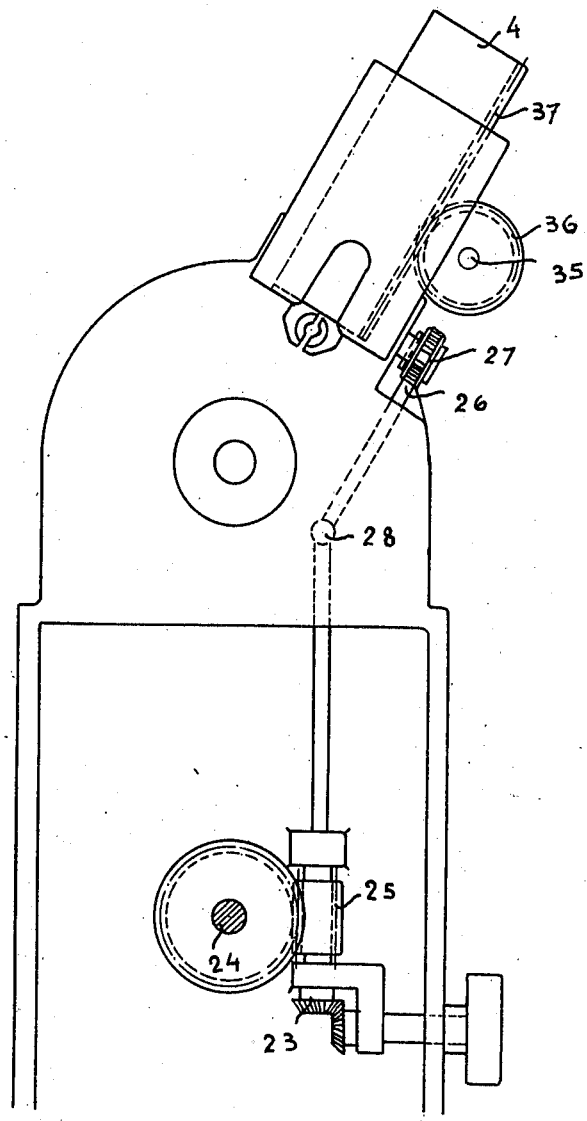

UNITED STATES PATENT OFFICE.

DAVID MILLINGTON AND CHRISTOFFER MUNTHE, OF FRIEDENAU, NEAR BERLIN, GERMANY.

APPARATUS FOR SLITTING SCREWS.

988,802.  Specification of Letters Patent.  Patented Apr. 4, 1911.

Application filed July 7, 1910. Serial No. 570,799.

*To all whom it may concern:*

Be it known that we, DAVID MILLINGTON and CHRISTOFFER MUNTHE, subjects of the King of Great Britain and the King of Norway, respectively, and residents of Friedenau, near Berlin, Germany, have invented certain new and useful Improvements in Apparatus for Slitting Screws, of which the following is a specification.

This invention has for its object to provide an improved apparatus for slitting screws and the like articles, specially designed for use with turret lathes and the like machines.

In the improved apparatus the screw which is to be slit, is moved at right angles to its own axis parallelly to the plane of the slitting saw. This affords the advantage that the slit is made of uniform depth throughout its length. For this purpose the device for holding the screw, hereinafter called the holder, is fixed in a slide which receives up-and-down movement from the main drive of the lathe and is moved tangentially past the slitting saw.

One form of this invention is illustrated in the accompanying drawings, in which—

Figure 1 is a front elevation of the improved apparatus; Fig. 2 is a section on the line A—B of Fig. 1; Fig. 3 is a section on the line C—D of Fig. 2; Figs. 4 and 5 illustrate details of the improved apparatus; Fig. 6 is a front elevation of the slide-operating mechanism with the holder; Fig. 7 is a side elevation thereof; and Fig. 8 is a rear elevation of the mechanism for driving the slitting saw.

As shown, 1 is the casing of the headstock of the lathe. On it is fixed a bracket 2 which is provided in front with a slideway 3. In this slideway there works a slide 4 which carries at its lower end a holder having the form of tongs for receiving the screw as it is parted from the work. The lower arms of the holder are preferably provided with removable jaw liners for the purpose of enabling the holder to be adapted to different diameters of screws to be slit. A spring 6 presses the upper arms 7, 7', of the holder apart, and thus keeps the holder permanently in the closed state. Each of the two arms 5 of the holder is provided at its upper end with a spring stud 8. These studs 8 bear against the surface 9 when the holder is closed. As soon as the holder is opened, the studs snap into a recess 10 in the slide 11 and thus keep the holder in its open position. When a screw is finished and cut off from the bar, and is held in the holder 5, the slide 4 is moved upward. By this means the screw is carried past the circular saw 12 which cuts a slit in the head of the screw. Just before the slide 4 has reached the top of its stroke, the two upper ends 7, 7', of the holder strike against a cam stop fixed to the bracket 2 by the inclined surfaces of which they are forced toward each other in opposition to the tendency of the spring 6, so that the holder now releases the finished screw and allows it to drop on to the chute 15 which conveys it into a receiver. As the ends 7, 7', of the holder move toward each other, the studs 8 move over the recess 10 of the slide 11, into which they are caused by the spring 16 to snap and thus keep the holder in its open state. During the downward movement of the slide, the holder remains in its open state until a stop 17 strikes against a stop 18. In this movement the slide 11 is moved by a rod 19 in opposition to the spring 20 in such a manner as to press by means of the inclined surface 21 the studs 8 back into the arms 7, 7', which, being then acted upon by the spring 6, act to close the holder. This closing of the holder must be effected at the moment when the holder is on a level with the screw which it is to receive, the stop 18 being made adjustable for that purpose.

The slitting saw is mounted in an eccentric brush or sleeve 22, so that by turning the latter on its axis the saw can be moved toward or away from the holder containing the screw to be slit. The slitting saw is driven directly from the main shaft 23 of the lathe which also drives the drum shaft 24. For this purpose the main shaft 23 is extended over the worm 25 by which the drum shaft is driven, and it is provided at its upper end with a second worm 26 which gears with a worm wheel 27 mounted on the spindle of the circular saw. In the example shown, the main shaft is provided with a ball and socket joint 28, but this latter is not absolutely necessary, because the main shaft may be connected by means of a flexible shaft with the worm 26. Since the spindle 16$^x$ of the circular saw 12 is shifted by turning the eccentric bush 22, it is necessary to shift also the worm wheel 26 which drives the saw, in order that this wheel shall remain permanently in engagement. For this purpose a bent arm 14 is rotatably mounted on the saw spindle, and the shaft that drives the saw is mounted in this bent arm (Figs. 4 and 5).

The upward and downward movement of the slide is derived from a cam 29 which is mounted on the drum shaft, and coöperates with a rocking lever 30 pivoted to the frame of the machine. For this purpose this lever is provided with a roller 31 sliding over the cam. The free end of the lever 30 carries a rod 32 provided with teeth 33 that engage a wheel 34 fixed on the shaft 35. On this shaft 35 is fixed a second toothed wheel 36 gearing with a rack 37 on the slide. As the rocking lever 30 is moved up and down by the cam, the toothed wheel 36 will be rotated to a corresponding extent, and will cause the slide 4 that carries the holder 5, to move up and down as well. This arrangement affords the advantage that the up and down movement of the holder is produced by positive means, and can be regulated quite independently of the speed of revolution of the drum shaft to suit the particular purpose in view, so that, for instance, the holder can readily be caused to move down quickly and move up slowly.

When it is desired to cut two slits in the head of the screw or to cut flats on two sides of the screw, two saws may be arranged side by side, instead of only one saw, without effecting the nature of the invention in any way.

We claim:

1. In combination in apparatus of the class described, a saw member, a holder for the screw, a slide carrying said holder and movable in a plane parallel or coincident with the plane of the saw member and tangential to the edge of said saw member, said slide having teeth thereon, a toothed wheel meshing with said teeth, a cam means whereby the same is driven from the drum shaft of the lathe to which the apparatus is applied, and a rack and pinion connection between the cam and the toothed wheel, substantially as described.

2. In combination in apparatus of the class described, a saw member, a holder for the screw consisting of a pair of pivoted arms having jaws for engaging the screw, a reciprocating slide carrying the said holder, cam means on the frame for engaging the arms of the holder for opening the jaws, detent means for holding the jaws in open position, and means for releasing the detent means for the closing of the jaws when the holder moves downwardly, substantially as described.

3. In apparatus of the class described, the combination of a saw member, a holder comprising a pair of spring pressed pivoted arms having jaws for engaging the screw, a reciprocating carrier for the holder, detent means for holding the jaws of the holder in open position, and a supplemental slide on the main slide with means for operating the same to release the detent means and permit the jaws of the holder to close, substantially as described.

4. In combination in apparatus of the class described, a saw member, a pair of spring pressed pivoted jaws, a slide carrying the said jaws, a detent for each jaw, cam means for opening the jaws as the slide moves away from the saw, a supplemental slide on the main slide with which the detents engage for holding the jaws open, and stops, one on the main slide and one on the frame, the stop of the slide being movable and connected with the supplemental slide for operating the same to release the detent for closing of the jaws, substantially as described.

In testimony whereof, we affix our signatures in presence of two witnesses.

DAVID MILLINGTON.
CHRISTOFFER MUNTHE.

Witnesses:
 WOLDEMAR HAUPT,
 HENRY HASPER.